United States Patent [19]

Tang

[11] Patent Number: 5,464,597
[45] Date of Patent: Nov. 7, 1995

[54] METHOD FOR CLEANING AND COOLING SYNTHESIZED GAS

[75] Inventor: John T. Tang, Robbinsville, N.J.

[73] Assignee: Foster Wheeler Energy Corporation, Clinton, N.J.

[21] Appl. No.: 198,752

[22] Filed: Feb. 18, 1994

[51] Int. Cl.⁶ .............................. B01J 8/18; B01D 53/12; B01D 53/48
[52] U.S. Cl. ................. 423/210; 423/242.1; 423/244.07; 423/DIG. 16; 95/108; 95/137; 48/198.3
[58] Field of Search ............................ 95/41, 137, 271, 95/108; 423/210, 242.1, 244.07, DIG. 16; 48/198.3, 198.8

[56] References Cited

U.S. PATENT DOCUMENTS

| | | | |
|---|---|---|---|
| 3,981,355 | 9/1976 | Squires | 165/2 |
| 4,239,693 | 12/1980 | McCallister | 260/449.5 |
| 4,246,242 | 1/1981 | Butler et al. | 423/210 |
| 4,273,750 | 6/1981 | Hollett, Jr. et al. | 423/244 |
| 4,346,064 | 8/1982 | Leon | 423/244 |
| 4,409,196 | 10/1983 | Skinner et al. | 423/359 |
| 4,539,188 | 9/1985 | Hirsch et al. | 423/210 |
| 4,548,797 | 10/1985 | Sauer et al. | 423/240 |
| 4,613,344 | 9/1986 | Henrich et al. | 48/77 |
| 5,032,143 | 7/1991 | Ritakallio | 23/313 FB |
| 5,096,680 | 3/1992 | Lindbauer et al. | 423/239 |
| 5,140,950 | 8/1992 | Abdulally | 122/4 D |
| 5,205,350 | 4/1993 | Hirsch et al. | 165/104.18 |
| 5,218,932 | 6/1993 | Abdulally | 122/4 D |
| 5,226,475 | 7/1993 | Ruottu | 165/104.18 |

Primary Examiner—Gary P. Straub
Assistant Examiner—Timothy C. Vanoy
Attorney, Agent, or Firm—Marvin A. Naigur

[57] ABSTRACT

A method and apparatus for treating gas introduced into a vessel containing a particulate material at a temperature less than that of the gas in a manner so that said material reduces the temperature of the gas and the gas entrains at least a portion of the material. The entrained material is then separated from the gas and passed to a heat exchanger to cool the material while the separated gas is passed to a turbine to drive same. At least a portion of the exhaust gas from the turbine is passed to the heat exchanger in a manner to fluidize the material in the heat exchanger and the cooled separated material is returned back to the vessel.

16 Claims, 1 Drawing Sheet

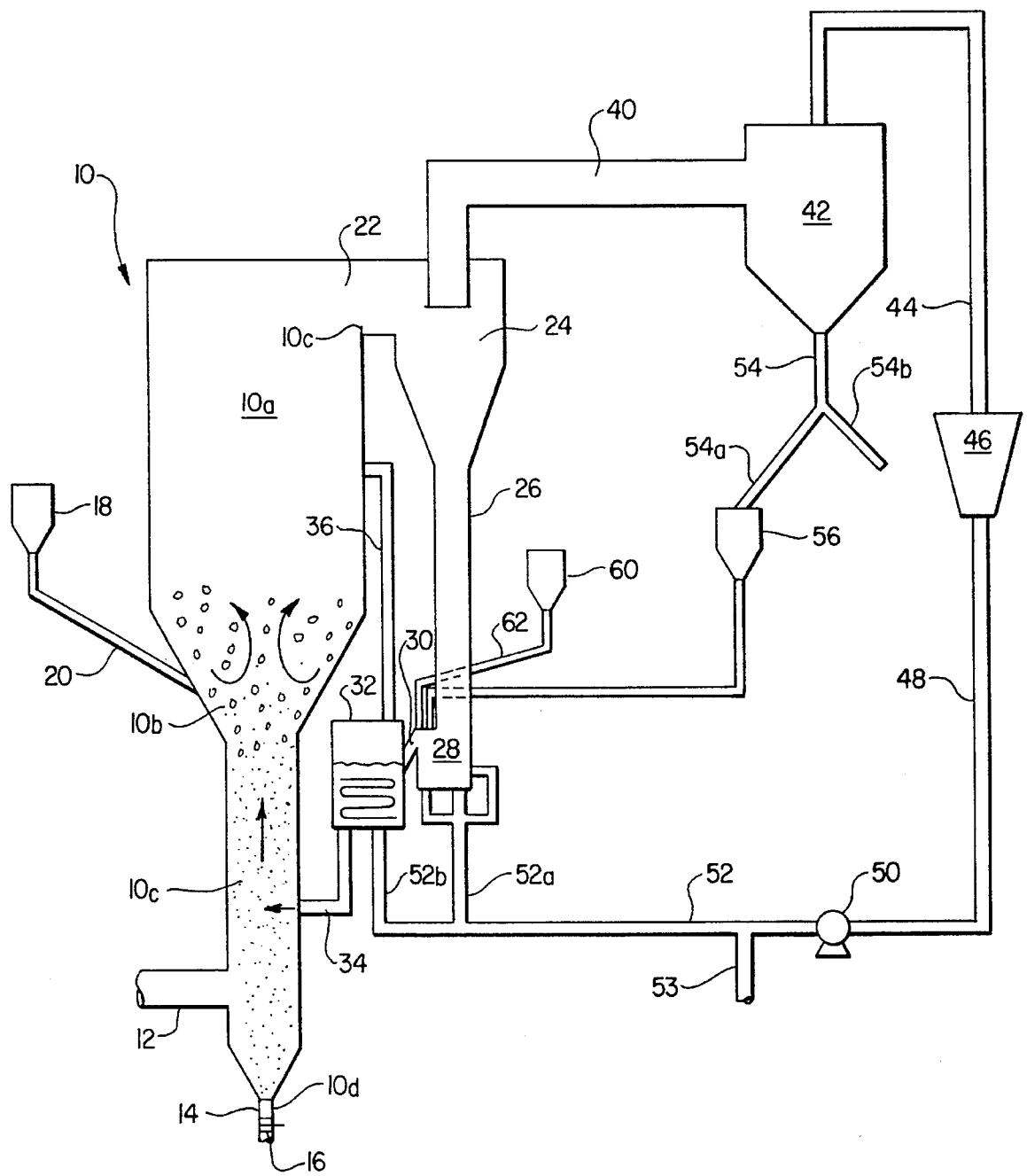

METHOD FOR CLEANING AND COOLING SYNTHESIZED GAS

BACKGROUND OF THE INVENTION

This invention relates to a method of, cleaning and cooling synthesized gas and, more particularly, to such a method utilizing particulate material which is spouted in, and recirculated through, a vessel.

Several well-known techniques are available for producing synthethized gas (hereinafter referred to as "syngas") which is used for driving gas turbines, or the like. However, the syngas so produced often contains a relative high quantity of sulfur which must be removed to comply with federal and state emissions standards.

One of the most popular techniques for removing the sulfur constituents from the syngas is a wet scrubbing process which is relatively expensive. Another sulfur-removing process which is more cost-effective involves reacting a sorbent, such as limestone, with the syngas at a proper temperature so that the sorbent absorbs, or captures, the sulfur. However, syngas that is produced in accordance with conventional techniques is usually at a relatively high temperature (i.e., in excess of 2000° F.) which is above that necessary to achieve this type of absorption.

Also, the syngas so produced contains corrosive gaseous species such as HCl, CO, and $NH^3$, and undesirable alkali particles which also should be removed before the syngas is routed to the turbine.

SUMMARY OF THE INVENTION

It is therefore an object of the present invention to provide a syngas treatment method which utilizes a sorbent to absorb the sulfur and/or other corrosive constituents from the syngas.

It is a further object of the present invention to provide a method of the above type in which the temperature of the syngas is reduced to a level consistent with the absorption of the sulfur.

It is a further object of the present invention to provide a method of the above type which utilizes a spouting bed of particulate material formed in a vessel and the recirculation of the entrained particles back to the vessel.

It is a further object of the present invention to provide a method of the above type in which the syngas discharges from the vessel and is separated from the entrained particles, and the latter particles are cooled in a heat exchanger and returned to the vessel.

It is a further object of the present invention to provide a method of the above type in which the separated syngas is utilized to drive a turbine, and the exhaust gases from the turbine are passed to the above heat exchanger.

It is a still further object of the present invention to provide a method of the above type in which the sorbent is mixed with the exhaust gas from the turbine before being introduced into the vessel.

It is a still further object of the present invention to provide a method of the above type in which a pressure seal is established between the vessel inlet and the separator outlet to prevent the backflow of the separated material from the latter inlet to the latter outlet.

It is a still further object of the present invention to provide a method of the above type in which the exhaust gases from the turbine are also passed to the pressure seal to aerate same.

Towards the fulfillment of these and other objects, the method of the present invention features the cooling and cleaning of syngas which contains sulfur and other undesirable constituents at a relative high temperature. According to the present invention, the syngas is introduced into a vessel containing a particulate material at a temperature less than that of the syngas in a manner so that said material reduces the temperature of the syngas and the syngas entrains at least a portion of the material. The entrained material is then separated from the syngas and passed to a heat exchanger to cool the material while the separated syngas is passed to a turbine to drive same. At least a portion of the exhaust gas from the turbine is passed to the heat exchanger in a manner to fluidize the material in the heat exchanger and the cooled separated material is returned back to the vessel.

BRIEF DESCRIPTION OF THE DRAWING

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings which is a schematic representation of the present invention.

DESCRIPTION OF THE PREFERRED EMBODIMENT

Referring to the drawing, the reference numeral 10 refers, in general, to a vessel having an upper cylindrical section 10a, an intermediate conical section 10b, and a lower cylindrical section 10c, of a lesser diameter than the upper section 10a, which terminates in a conical section 10d. A horizontally-extending inlet duct 12 registers with a corresponding opening formed in the wall of the lower cylindrical section 10c for introducing syngas into the vessel 10, and a vertically-extending outlet duct 14 registers with the lower, open end of the conical section 10d for draining the vessel under the control of a valve 16 disposed in the latter duct.

A storage/transfer bin 18 is located adjacent the vessel 10 for storing and transferring a relatively coarse, inert material, such as coarse sand, to the vessel 10a, via a duct 20 connecting the outlet of the bin 18 to an inlet opening extending through the wall of the conical vessel section 10b. A duct 22 registers with an opening formed through the upper cylindrical vessel section 10a and connects the vessel 10 with a cyclone separator 24 disposed adjacent the vessel. A dipleg 26 connects the lower portion of the separator 24 with a pressure seal, in the form of a J-valve 28, which, in turn, is connected, via a duct 30, to a heat exchanger 32. A duct 34 connects an outlet opening formed in the lower portion of the heat exchanger 32 to the vessel 10 via an opening formed in the wall of the lower vessel section 10c, and a duct 36 extends from an outlet opening formed in the upper portion of the heat exchanger 32 to an opening formed through the upper vessel section 10a.

A duct 40 extends from the interior of the separator 24 to a relatively fine-particle removal device 42, which has a gas outlet connected, by a duct 44, to the inlet of a gas turbine 46. A duct 48 extends from the outlet of the gas turbine 46 to a compressor 50, and a duct 52 extends from the outlet of the compressor 50. The duct 52 branches into two ducts 52a and 52b which are respectively connected to appropriate inlet openings formed in the J-valve 28 and the heat exchanger 32. A duct 53 extends from an external source (not shown) of nitrogen gas or steam and is connected to the duct 52.

A duct 54 extends from a solids outlet at the lower portion of the device 42 and branches into two branch ducts 54a and 54b, respectively. The branch duct 54a extends to a storage/ transfer bin 56 having an outlet connected, via a duct 58, to an inlet formed in the J-valve 28. The branch duct 54b extends to an storage area (not shown) located externally of the device 42 and it is understood that a valve, or the like (not shown), is provided to selectively switch between the ducts 54a and 54b.

A storage/transfer bin 60 for a sulfur absorbing material, such as limestone, is provided adjacent the separator and has an outlet connected, via a duct 62, to the J-valve 28.

In operation, sand, or another relatively coarse, inert material, at ambient temperature passes from the bin 18 and into the vessel 10 where it accumulates in the lower vessel section 10c and the intermediate vessel section 10b. Syngas, from an upstream production facility, at an elevated temperature (usually in excess of 2000° F.) and containing sulfur and corrosive gaseous species and alkali particles is also introduced into the vessel 10 through the inlet duct 12. Relatively fine sorbent material, such as limestone, also passes into the vessel 10 via the J-valve 28 and the heat exchanger 32 in a manner to be described.

The velocity of the syngas introduced into the vessel is controlled so that the bed material, including the inert and sorbent material, behaves as a "spouting" bed, i.e., the syngas mixes with and entrains the relatively fine material which is largely sorbent, while the relatively coarse inert material spouts and thus moves sufficiently in the vessel to promote the latter mixing. As a result, the syngas entrains a portion of the relatively fine, sorbent material, passes upwardly through the vessel 10 and exits through the opening in the upper vessel section and into the duct 22. The separator 24 receives the syngas, with the entrained sorbent particles, from the duct 22 and operates to separate the former from the latter by cyclone separation in a conventional manner. The separated sorbent particles from the separator pass, via the dipleg 26, to the J-valve which operates in a conventional manner to establish a pressure seal between the vessel 10 and the separator 24 to prevent backflow of the material contained in the vessel to the separator.

A fresh supply of sorbent particles from the bin 60 passes into the outlet section of the J-valve 28 and thus combines with the separated sorbent particles in the J-valve before the mixture passes into the heat exchanger 32. The heat exchanger 32 is of a conventional design and, as such, includes heat exchange surfaces through which a cooling fluid is passed to remove heat from the mixture of particles before the latter pass into the vessel 10.

The separated gas from the separator 24 passes into the particle removal device 42 which operates in a conventional manner to remove additional, very fine, sorbent particles from the gas before the latter is passed to the turbine 46 to drive same. The expanded exhaust gas from the turbine 46 passes through the compressor 50 and into the duct 52 and its branch ducts 52a and 52b before being passed to the J-valve 28 and the heat exchanger 32, respectively. The exhaust gas fluidizes the solid particles in the heat exchanger 32 to promote the heat exchange process and aerates the particles in the J-valve to promote the flow of the particles to the heat exchanger. Nitrogen gas or steam from the duct 53 can be introduced as needed into the duct 52 to reduce the oxygen content of the gas introduced to the heat exchanger 32 and the J-valve 28. The heat exchanger 32 is vented by the duct 36 which thus transfers excess gas therein to the vessel 10.

As a result of the foregoing, the syngas is cooled by the returned cooled sorbent materials from the heat exchanger in the vessel 10 to a temperature required for reaction of the sorbent with the sulfur in the syngas which, in the case of limestone, is approximately 1600° F. Also, the recycled sorbent passes to the J-valve 28 where it is fluidized by the exhaust gas from the turbine 46. The latter gas also promotes the flow of the sorbent to the heat exchanger 32 where it is cooled before being introduced into the vessel 10 to promote the absorption of corrosive gaseous species and pollutants. Further, the advantages of both a spouting bed and a recirculation bed material are realized to improve mixing, temperature reduction and absorption. Moreover, both the recycled sorbent particles and the fresh sorbent particles are cooled in the heat exchanger 32 before they are introduced into the vessel 10 while the exhaust gas from the turbine is used to fluidize the heat exchanger 32 and aerate the J-valve 28.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of treating gas comprising the steps of passing said gas into a vessel containing a particulate material at a temperature less than that of said gas in a manner so that said gas is cooled and entrains at least a portion of said material, passing said gas with said entrained material to a separator for separating said entrained material from said gas, passing said separated material back to said vessel in a manner to establish a pressure seal between said vessel and said separator to prevent the backflow of said material to said separator, passing said separated gas to a turbine to drive same, and passing the exhaust gas from said turbine to said pressure seal to aerate said separated material to promote the flow of said separated material from said pressure seal.

2. The method of claim 1 further comprising the step of passing said separated material to a heat exchanger to cool same before said step of passing said separated material back to said vessel.

3. The method of claim 2 further comprising the step of passing a portion of said exhaust gas to said heat exchanger in a manner to fluidize the material in said heat exchanger.

4. The method of claim 1 or 3 wherein said gas contains sulfur and/or sulfur oxides and further comprising the steps of introducing a sorbent for said sulfur and/or sulfur oxides to said pressure seal for mixing with said exhaust gas and said separated material before passing to said vessel.

5. The method of claim 1 wherein said step of passing said separated gas to said turbine comprises the step of passing said gas to an additional separator for separating additional entrained material from said gas before said gag is passed to said turbine.

6. The method of claim 1 further comprising the step of compressing said separated gas before it is passed to said pressure seal.

7. The method of claim 1 further comprising the step of adding nitrogen gas or steam to said separated gas before the latter is passed to said pressure seal.

8. The method of claim 1 wherein said material consists of relatively course material and relatively fine material and wherein said first step of passing comprises the step of passing said gas through said material in a manner to cause movement of said relatively course material to mix said gas with said relatively fine material.

9. A method of treating gas comprising the steps of passing said gas into a vessel containing a particulate material at a temperature less than that of said gas in a manner so that said gas is cooled and entrains at least a portion of said material, passing said gas with said entrained material to a separator for separating said entrained material from said gas, passing said separated material to a heat exchanger, passing said separated material from said heat exchanger back to said vessel, establishing a pressure seal between said vessel and said separator to prevent the backflow of said material to said separator, passing said separated gas to a turbine to drive same, passing a first portion of the exhaust gas from said turbine to said heat exchanger to fluidize said separated material in said heat exchanger and passing a second portion of said exhaust gas to said pressure seal to aerate said separated material in said pressure seal to promote the flow of same from said pressure seal to said heat exchanger.

10. The method of claim 9 wherein said material passes from said separator, through said pressure seal, then through said heat exchanger and then to said vessel.

11. The method of claim 10 wherein said gas contains sulfur and/or sulfur oxides and further comprising the steps of introducing a sorbent for said sulfur and/or sulfur oxides to said pressure seal for mixing with said exhaust gas.

12. The method of claim 11 further comprising the step of passing a cooling fluid through said heat exchanger to cool said separated recycled material.

13. The method of claim 9 wherein said step of passing said separated gas to said turbine comprises the step of passing said latter gas to an additional separator for separating additional entrained material from said gas before said gas is passed to said turbine.

14. The method of claim 9 further comprising the step of compressing said exhaust gas before it is passed to said heat exchanger and to said pressure seal.

15. The method of claim 9 further comprising the step of adding nitrogen gas or steam to said exhaust gas before the latter is passed to said heat exchanger and to said pressure seal.

16. The method of claim 9 wherein said material consists of relatively course material and relatively fine material and wherein said first step of passing comprises the step of passing said gas through said material at a velocity to cause movement of said relatively course material sufficient to mix said gas with said relatively fine material.

\* \* \* \* \*